March 11, 1924.
P. STOKES
1,486,612
STEERING CONTROLLER AND SHOCK ABSORBER FOR VEHICLES
Filed Nov. 19, 1917
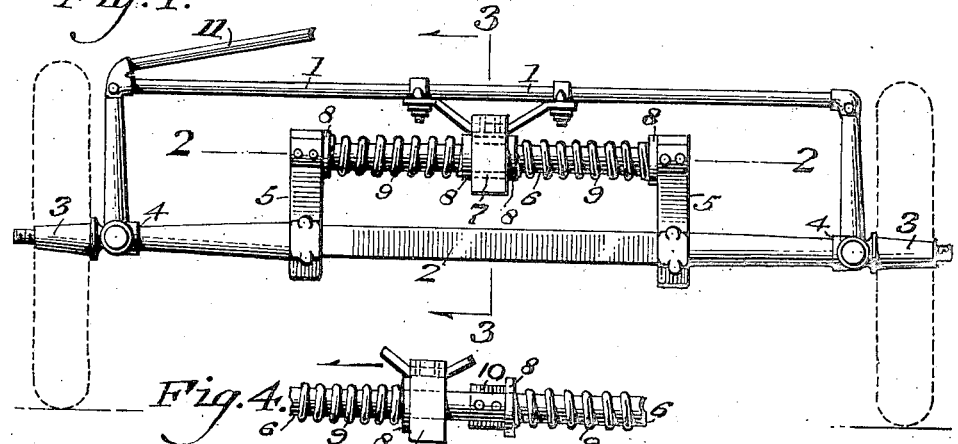
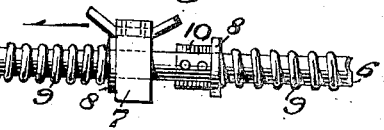
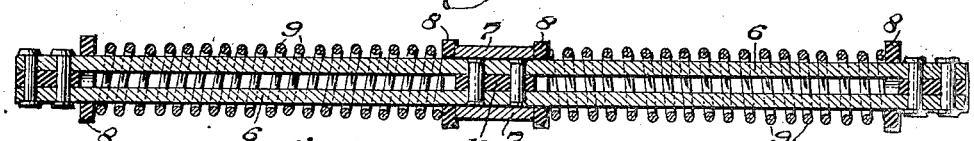
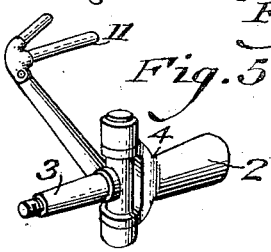
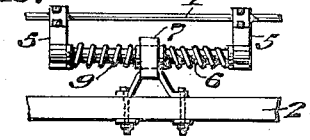
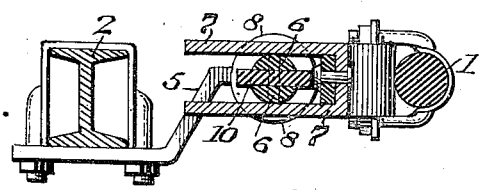
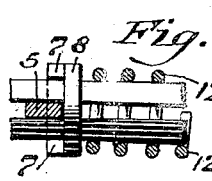
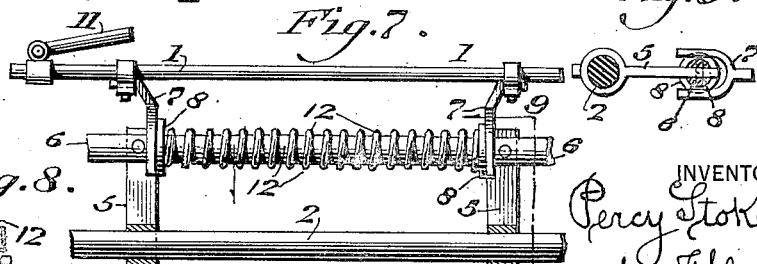
INVENTOR
Percy Stokes.
BY
Dieder sheim + Fairbanks
ATTORNEYS Patented Mar. 11, 1924.

1,486,612

UNITED STATES PATENT OFFICE.

PERCY STOKES, OF PHILADELPHIA, PENNSYLVANIA.

STEERING CONTROLLER AND SHOCK ABSORBER FOR VEHICLES.

Application filed November 19, 1917. Serial No. 202,686.

*To all whom it may concern:*

Be it known that I, PERCY STOKES, a citizen of the United States, residing in the city and county of Philadelphia, State of Pennsylvania, have invented a new and useful Steering Controller and Shock Absorber for Vehicles, of which the following is a specification.

My invention relates to the steering device of a vehicle, more particularly of the order of an automobile, in which provision is made for controlling the wheels thereof straight-ahead, and relieving the wheels and steering mechanism of lateral shocks in the event of the wheels striking obstructions in their path, while also resisting an undesired change of direction. It consists also of details of construction as will be hereinafter set forth.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a plan view of a steering device embodying my invention.

Figure 2 represents a longitudinal section of a portion thereof on line 2—2 Figure 1, on a different scale.

Figure 3 represents a vertical section on line 3—3 Figure 1, on an enlarged scale.

Figure 4 represents a view of a portion of Figure 1, certain members thereof being in different positions from those in the latter.

Figure 5 represents a perspective view of detached members of the device.

Figure 6 represents an end view of an auxiliary bar employed.

Figure 7 represents a plan view of another embodiment of the invention.

Figure 8 represents a front elevation of a portion of Figure 7 and adjacent members in section on an enlarged scale. Figure 9 represents a section of a portion on line 9—9 Figure 7. Figure 10 represents a portion of a modification.

Similar numerals of reference indicate corresponding parts in the figures. Referring to the drawings.

1 designates the tie rod of an automobile, 2 designates the axle bar. 3 designates the axles of the wheels, and 4 the joints of said axles all as well known in an automobile.

Fixed to the axle bar and extending rearward of the same are the arms 5 with which is connected the auxiliary or supplemental bar 6 which is parallel with the bar 2 and rod 1 and interposed between the same.

The central portion of said bar 6 is freely embraced by the yoke 7, in the present case of the form of a bifurcation, it being connected in any suitable manner with the tie rod 1 and serving to travel therewith. On said supplemental bar 6 on opposite sides of said yoke or traveller 7 are the movable collars 8, between each pair of which are the coil springs 9 which are sustained on said rod 6 on opposite sides of said traveller 7, while engaged by the collars 8 so that the movements of the latter will compress or contract either of said springs, as will be hereafter more fully referred to.

In order to limit the springs in their expansion and consequently in their normal condition, there is secured to the central portion of the supplemental bar 6, the stop piece 10 whose sides project therefrom forming shoulders against which the collars may abut, as most plainly shown in Figure 4, it being seen also that the traveller 7 may ride over said piece 10 and engage with either the right or left collar 8, as also shown in said figure. As the traveller is bifurcated it freely embraces said stop piece and so is guided in its sliding motions thereon, and in a measure is retained in position thereon without liability to turn on the auxiliary bar or vice versa.

In the present case, the auxiliary bar is formed preferably of half-round separate sections spaced apart and having the stop piece 10 fitted in the space between the sections at the central portions thereof and secured thereto by rivets or other suitable means passed through the sections and piece firmly connecting the piece and sections. Other portions of the sections, preferably the terminals thereof, are also connected by rivets or other suitable means, all as plainly shown in Figures 2, 3, and 7.

The tie rod 1 may be operated by the draft bar or member 11, which is under the control of the chauffeur or driver of the automobile, it being seen that in steering the latter to the right or left, the traveller 7 follows the motions of said tie rod and compresses either spring 9 to the right or left, and when the steering is again straight to the front, by the proper rotation of the steering wheel or lever, the spring that was contracted now expands and so restores the traveler and tie rod to their normal positions, and consequently placing the wheels straight-ahead, the chauffeur or driver having been materially assisted in accomplishing said object by said spring, the traveller 7 then being centered on the supplemental bar.

Should the wheels strike obstructions in their path whereby they will be deflected say to the right or left, the shocks or blows imparted laterally to the wheels will be imparted through the axles to the tie rod 1, and the traveller 7 to either spring, the latter thus acting as a cushion, which will absorb the shock and prevent injury to the relative members of the vehicle, and resist an undesired change of direction. As soon as the obstruction is passed the compressed or contracted spring expands and it again centers the traveller placing the tie rod and the wheels in position to cause straight running ahead of the vehicle as before.

Figures 7, 8 and 9 show another embodiment of the invention in which the tie rod 1 is provided with a plurality of travellers 7 which are adapted to engage the opposite terminals of the single spring 12 which occupies the supplemental bar 6. The bifurcations of the travellers are adapted to ride freely over the terminal portions of the bar 6 and adjacent portions of the arms 5 but the operation is in effect the same as in the previous case.

In Figure 10 I show the traveller 7 connected with the axle bar 2, and the spring carrying bar 6, supported on the tie rod 1 by the arms 5, but the operation and results are the same as those in the other figures.

Having thus described my invention what I claim as new and desire to secure by Letters Patent, is;

1. In a steering device and shock absorber for a vehicle having a tie rod and axle bar, the combination therewith of an auxiliary bar and stop member and arms carrying said auxiliary bar, said auxiliary bar carrying a resilient member adapted to engage a traveller connectible with said tie-rod, said stop member being adapted to prevent the action of said resilient member against said traveller in more than one direction at a time, said auxiliary bar being formed of separate sections spaced apart and secured together, said stop member and arms being between said sections and connected therewith.

2. In a steering device and shock absorber for a vehicle having a tie-rod and axle bar, the combination of an auxiliary bar carrying resilient means, adapted to engage a member connectible to and moving with said tie-rod, and means to prevent the latter from being acted upon by said resilient means in more than one direction at a time, said auxiliary bar being formed of separate sections, spaced apart and secured together, spacing pieces being placed between said sections and connected thereto, said spacing pieces acting also as stopping means to determine the position and limit the action of said resilient means.

3. In a steering device and shock absorber for a vehicle having a tie-rod and axle bar, the combination of an auxiliary bar carrying resilient means, adapted to engage a member connectible to and moving with said tie-rod, and means to prevent the latter from being acted upon by said resilient means in more than one direction at a time, said auxiliary bar being formed of separate sections, spaced apart and secured together, spacing pieces being placed between said sections and connected thereto, said spacing pieces acting also as supporting arms and as stopping means to determine the position and limit the action of said resilient means.

PERCY STOKES.

Witnesses:
 JOHN A. WIEDERSHEIM,
 N. BUSSINGER.